Figure 1:
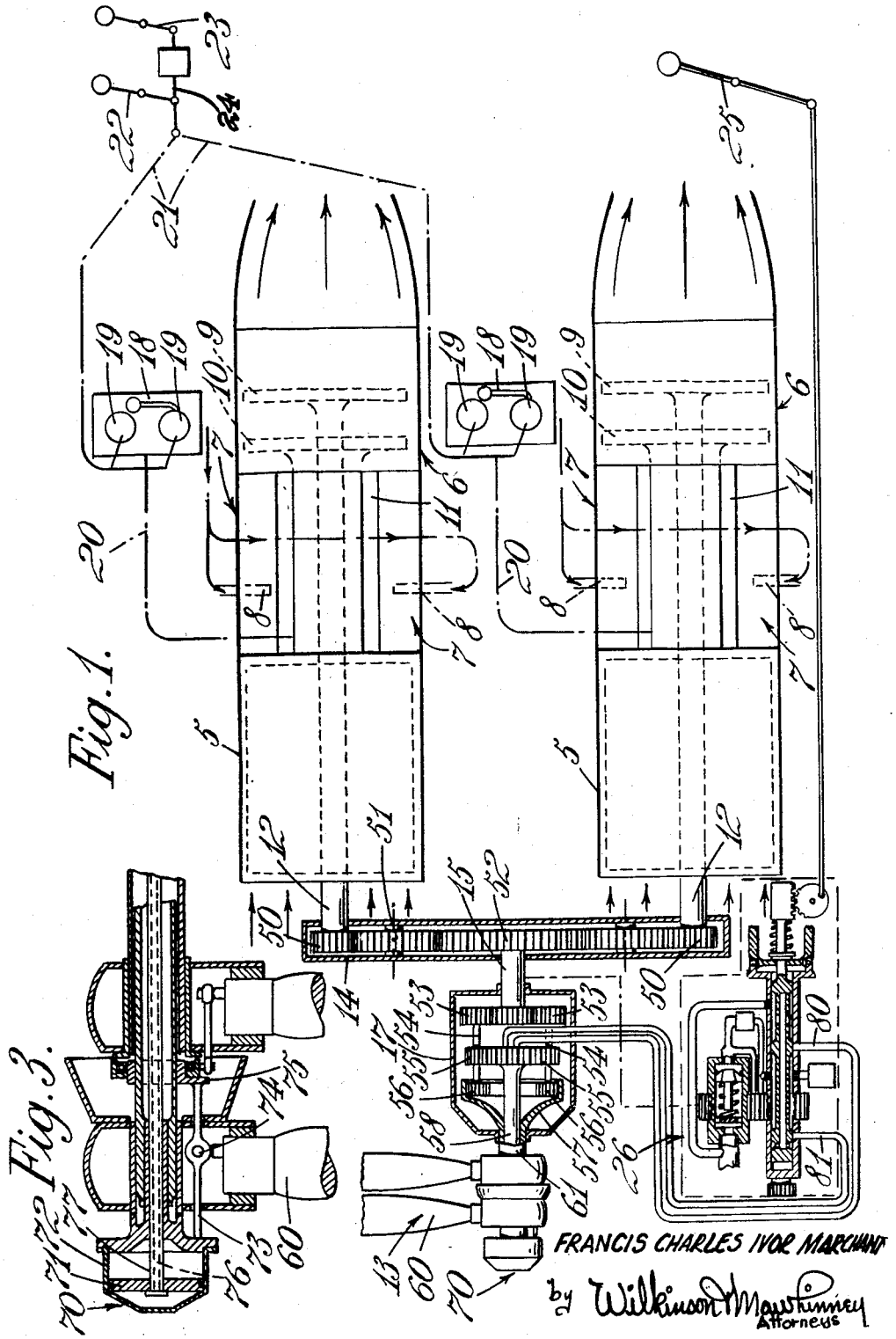

United States Patent Office 2,696,268
Patented Dec. 7, 1954

2,696,268

CONTROL SYSTEM FOR GAS TURBINE POWER PLANTS AND VARIABLE PITCH PROPELLERS DRIVEN THEREBY

Francis Charles Ivor Marchant, Bristol, England, assignor to The Bristol Aeroplane Company Limited, Bristol, England, a British company Application October 5, 1948, Serial No. 52,959

5 Claims. (Cl. 170—135.29)

This invention concerns control systems for a gas-turbine power-plant which comprises two engines each having a pair of turbines through which the working fluid passes in succession (one turbine driving the engine compressor(s) and the other turbine providing useful work) the power turbines driving a common output shaft—for example, an airscrew shaft.

The object of this invention is to provide a control system whereby the operating conditions of the power-plant are selectable at will and the two engines are relatively adjustable so that the performance of each best accords with the selected operating conditions.

According to the present invention a control system for a gas-turbine power-plant of the kind set forth comprises a first manual control for simultaneously varying the quantity of fuel supplied to both engines and an independent second manual control for simultaneously regulating the speed of the power turbines of both engines independently of their compressor turbines.

According to a feature of this invention a control system for a power-plant installation having two or more power-plants of the kind set forth comprises a manual control, common to all the power-plants, for simultaneously varying the quantity of fuel supplied to all the engines and an independent control common to all the power-plants for simultaneously adjusting the speed of all the power turbines.

This invention finds particular application to multi-engine aircraft having gas-turbine power-plants of the kind set forth each of which drives a variable-pitch propeller.

According to another feature of this invention a control system for a multi-engine aircraft having power-plants of the kind set forth (each of which drives a variable-pitch propeller) comprises a manual control common to all the power-plants for simultaneously varying the fuel supplied to all the engines and an independent control, common to all the propellers, for adjusting simultaneously the pitches thereof and hence the speed of all the power turbines.

It is preferred that a synchronising mechanism maintains the propellers automatically at the same speed. With such an arrangement the manual control will adjust the propeller of a master engine and the propeller of the slave engines will be correspondingly adjusted by the synchronising mechanism.

According to yet another feature of the invention all the compressors of a multi-power plant installation are automatically maintained at the same speed by a synchronising mechanism, the fuel supply to an engine having a master compressor being adjustable by the manual control and the fuel supply to the other engines being adjusted by said synchronising mechanism.

The synchronising mechanism in any of the arrangements referred to above is preferably such that any one of the compressors or propellers may, at will, be selected as the master.

Figure 2:
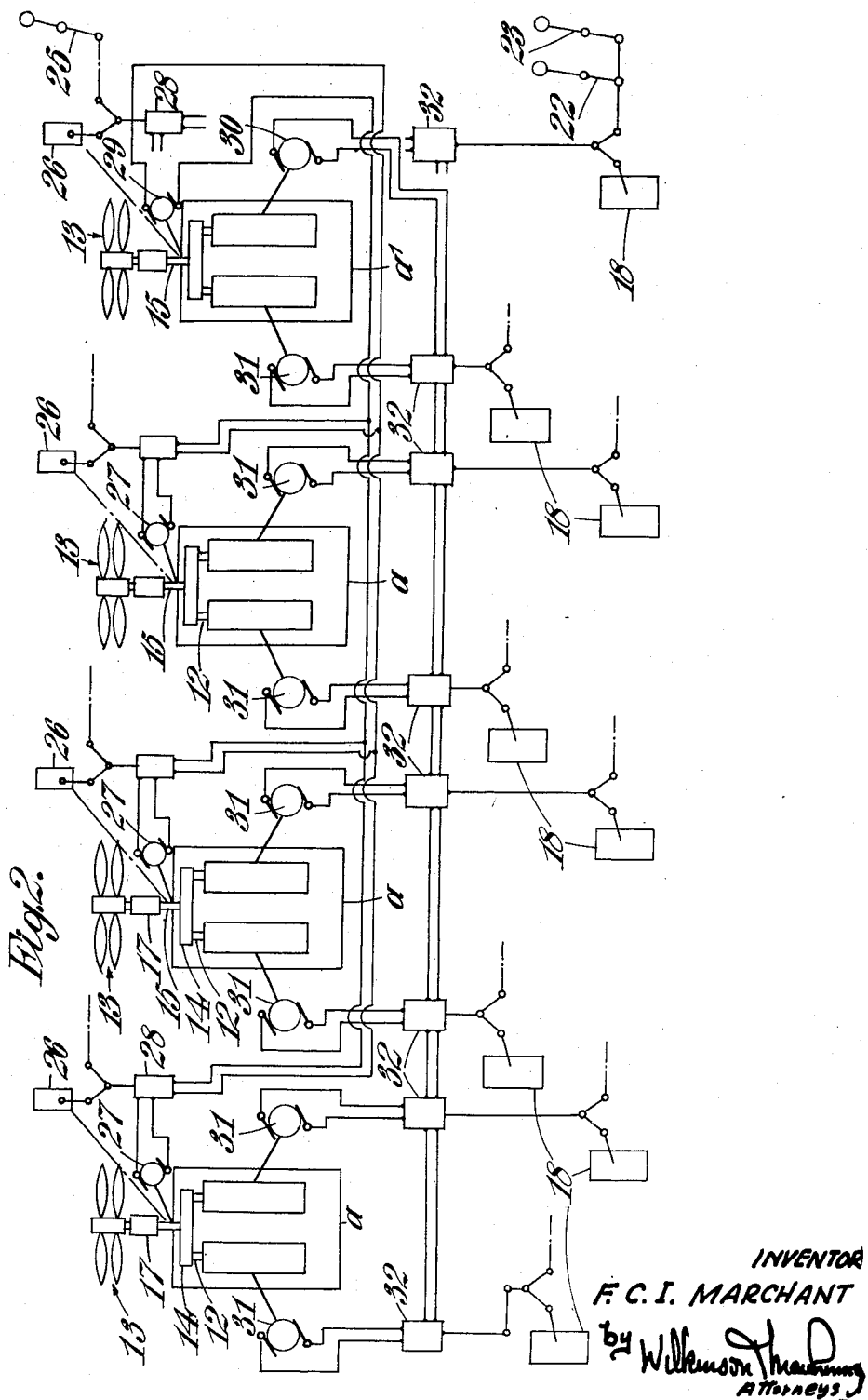

A practical application of the present invention will now be described, by way of example only, with reference to the accompanying drawings whereof:

Figure 1 is a schematic arrangement of a gas-turbine power-plant and a control system therefor in accordance with the present invention, Figure 2 is a schematic arrangement showing a plurality of the power-plants of Figure 1 arranged for driving a multi-engine airplane and a control system therefor in accordance with this invention, and Figure 3 is a partial view in cross section showing somewhat diagrammatically details of construction of part of the gas turbine power plant of Figure 1.

Referring first of all to Figure 1: the power-plant comprises a pair of gas-turbine engines each having a compressor 5, a turbine 6 and combustion equipment 7. Air from the compressor 5 passes to the combustion equipment 7 where fuel is burnt, as at 8, and the gases are then delivered to the turbine 6. The latter comprises a pair of independently rotating turbine rotors 9, 10. The rotor 10 is coupled to the compressor 5 by the shaft 11. Each rotor 9 drives a shaft 12 which carries a gear wheel 50 which drives through a gear wheel 51 a gear wheel 52 on a common shaft 15. The shaft 15 through an intermediate gear drives gear wheels 53 each carried on a separate shaft 54, and the shafts 54 each carry two further gear wheels 55, 56 of which gear wheels 55 drive a gear wheel on a shaft 58, carrying one airscrew 60 of a contra-rotating propeller 13 the other airscrew of which is carried on a shaft 61 carrying an annular gear 57 driven by the gear wheels 56.

A fuel-pump unit 18 is provided for each engine, the unit having a pair of fuel pumps 19 which are driven from the shaft 11. The connection between the unit 18 and the shaft 11 is diagrammatically indicated at 20. The speed and power output of the engine is determined by the quantity of fuel supplied to it by its unit 18 and to vary the fuel delivered by the pair of units 18 of the power-plant the units are both adjustable by a lever 22. The lever 22 is under the control of the flight engineer and is connected to both units by linkage 21. The flight engineer's control 22 is preferably interconnected with a pilot's throttle control 23 so that the unit 18 is independently adjustable by the engineer and the pilot. To this end the levers 22, 23 are coupled together by a connection 24 which is arranged so that the flight engineer's control can be overridden by the pilot at the latter's discretion.

With the arrangement described, when the pilot or the flight engineer adjusts the lever 23 or 22 respectively, units 18 are adjusted to vary the quantity of fuel passing to the engines. The speed of turbines 9, 10 is accordingly varied thereby varying the speeds of propeller 13 and compressor 5. In this way the combined power output of the engines is variable to suit any given operating conditions, such as take-off, climb and cruising flight.

Having selected the power to suit the conditions it is desirable that the speed of rotation of the turbines 9 be adjusted so that the performance of the engines will be an optimum for the particular operating conditions. To this end there is provided a manual control 25 to adjust a constant speed unit generally indicated at 26 of known form which is associated with the propeller 13. The lever 25 will vary the datum setting of the unit 26 thereby to adjust the pitch of the blades of the propeller 13. As a consequence a new speed of rotation for the power turbines will be obtained. The pitch change motor for varying the pitch of the propeller blades is generally indicated at 70 in Figures 1 and 3. The motor comprises a ram 71 and a cylinder 72 the cylinder being connected to each blade of the airscrew 60 by a connecting rod 73 and a cross head 74 to effect pitch changing movements of these blades. The blades of the other airscrew also derive their pitch changing movements from the cylinder 72, but through a ball thrust bearing 75 to allow for the opposite sense of rotation.

Hydraulic fluid is fed to the cylinder 72 on each side of the ram 71 by co-axial pipes 76, 77, of which the inner pipe 76 leads to the front of the ram and connects with pipe 80 from the constant speed unit 26 for the conveyance of coarse pitch hydraulic fluid, while the outer pipe 77 leads to the rear of the ram and connects with pipe 81 from the constant speed unit for the conveyance of fine pitch hydraulic fluid.

From the arrangement described, it will be appreciated that the pilot or flight engineer is in a position to adjust manually, and at will, the operating conditions of the power-plant to suit the flight conditions of the airplane and that thereafter he may adjust the speed of the propeller 13—and hence the speed of the turbines 9—to accord with the operating conditions of the plant.

When the power-plant of Figure 1 is installed in a multi-engine airplane it is preferred that this be done as shown in Figure 2. In this arrangement the power-plant $a'$ constitutes a master power-plant and the other three power-plants $a$ are connected together and to the master so that they are automatically controlled therewith. With this end in view the propellers 13 are all connected together by a synchronising mechanism so that their speeds of rotation are automatically maintained the same. All the compressors 5 are also connected together by a synchronising mechanism so that their speeds are synchronised with the right-hand engine of the master power plant $a'$.

Associated with each propeller 13 of power-plants $a$ is a generator 27 which is driven from shaft 15. The generator is connected to an associated electrical differential mechanism 28 of known construction as described in the specification of British Patent No. 515,934 with reference to Figure 2 of the drawings of the specification. Each electrical differential mechanism 28 is also connected in common with a generator 29 which is driven by the master power-plant $a'$. The mechanism 28 is such that whilst its generator 27 and generator 29 are being driven at the same speed a rotary element of the mechanism 28 is stationary. When a speed difference exists between a generator 27 and generator 29 the rotary element of the associated mechanism 28 is brought into operation to adjust its constant speed unit 26 thereby to change the pitch of the blades of its propeller 13 and bring the speed of the power-plant and of the generator 27 back into synchronism with that of the master.

The arrangement described is provided for each power-plant so that the power turbines 9 of all the power-plants are maintained at the same speed. When the propeller of plant $a'$ is adjusted by lever 25 the resultant difference in speed between the master generator 29 and the slave generators 27 will be noted by the associated mechanisms 28 and the constant speed units 26 of the slave plants $a$ will be adjusted to bring them to the same speed as the master power-plant $a'$.

The compressor 5 of the right-hand engine of power-plant $a'$ which has been selected as a master has a generator 30 which is driven by the compressor-turbine 10. Similarly connected with each of the other compressors is a generator 31 and it is arranged that the output of generator 30 and of each of the generators 31 is applied to an electrical differential mechanism 32 of known form associated with each generator 31. The differential mechanism 32 for each engine adjusts the fuel-pump unit 18 of its engine. The mechanisms 32 are as described in the specification of British Patent No. 516,613 with reference to Figure 1 of the drawings of the specification. In this way the quantity of fuel passing to each engine of the several power-plants is regulated so that the speed of the turbine rotor 10, and hence of the compressors 5, is the same as that of the master compressor. When the levers 22, 23 are adjusted to vary the fuel supplied by the unit 18 to the master engine the difference in speed which results between the master engine and the other engines will be detected by the differential mechanisms 32 and their associated units 18 will be correspondingly adjusted. In this way the speed of rotation of the compressors 5 of all the engines is kept the same.

It will be appreciated that any compressor of the various engines may be selected as a master. Similarly any propeller may be selected as the master. In this way, in the event of failure of an engine or a power-plant it is possible to stop that engine or power-plant and to use another such engine or power-plant as a master. The synchronising mechanism described is well known and the feature of selecting which engine or power-plant will constitute the master is a well known feature of such a mechanism.

With the power-plant described, in the event that one of the engines is put out of operation the other engine is required to drive the propeller and only the power turbine 9 of the idle engine as the rest of the rotary system of the idle engine is independent of it. In this way the power wastage is kept low.

I claim:

1. For an airplane power plant system having a plurality of power plants each comprising a pair of engines each of which comprises a compressor, a turbine drivingly connected to the compressor, a power turbine rotatable independently of the compressor turbine, the working fluid passing in series flow through the turbines and combustion equipment to which air from the compressor is delivered and in which fuel is burnt to produce said working fluid; a single power output shaft from each of said power plants, a constant speed variable pitch propeller mounted on each of said output shafts, a driving connection between the power turbine of each engine of each power plant and said power output shaft of its power plant, a control system operatively connected to each power plant and comprising a single manual fuel control common to all the engines for simultaneously varying the fuel supplied thereto to regulate the power of both turbines of each engine and maintain the engines at substantially equal speeds and an independent second single manual control operatively connected to and common to all the propellers for equally adjusting the speed settings thereof to select an optimum speed of the power turbines appropriate to the subsisting operating conditions.

2. For an airplane power plant system having a plurality of power plants each comprising a pair of engines each of which comprises a compressor, a turbine drivingly connected to the compressor, a power turbine rotatable independently of the compressor turbine, the working fluid passing in series flow through the turbines and combustion equipment to which air from the compressor is delivered and in which fuel is burnt to produce said working fluid; a single power output shaft from each of said power plants, a constant speed variable pitch propeller mounted on each of said output shafts, a driving connection between the power turbine of each engine of each power plant and said power output shaft of its power plant, a control system operatively connected to each power plant and comprising a manual fuel control common to all the engines for simultaneously varying the fuel supplied thereto to regulate the speed of both turbines of each engine and maintain the engines at substantially the same speed, and an independent second manual control operatively connected to and common to all the propellers for simultaneously adjusting the speed settings thereof to maintain the power turbines at substantially the same speed, said second manual control comprising a manual control element operatively connected to one of said propellers and a synchronizing system operatively connected to each of the other propellers as slaves and to said one propeller as master.

3. A control system according to claim 2 wherein said manual fuel control comprises a manual control element operatively connected to the fuel throttle of one of said engines and a synchronizing system operatively connected to the compressor turbine of said engine as master, to the compressor turbines of each of said other engines as slaves and to the fuel throttles of said other engines to maintain synchronism.

4. A control system as claimed in claim 1 wherein a synchronizing system is operatively connected to all the propellers for automatically maintaining the propellers at equal speeds, the said second manual control being applied to a master propeller, and a second synchronizing system is operatively connected to all said compressor turbines to maintain these latter at equal speeds, the said first manual control being applied to control the fuel supply to a master compressor turbine.

5. For an airplane power plant system having a plurality of power plants each comprising a pair of engines each of which comprises a compressor, a turbine drivingly connected to the compressor, a power turbine rotatable independently of the compressor turbine, the working fluid passing in series flow through the turbines and combustion equipment to which air from the compressor is delivered and in which fuel is burnt to produce said working fluid; a single power output shaft from each of said power plants, a constant speed variable pitch counter-rotating propeller mounted on each of said output shafts, a driving connection between the power turbine of each engine of each power plant and said power output shaft of its power plant, a control system operatively connected to each power plant and comprising a single manual fuel control common to all the engines for simultaneously varying the fuel supplied thereto to regulate the power of both turbines of each engine and maintain the engines at substantially equal speeds and an independent second single manual control operatively connected to and common to all the counter-rotating propellers for equally adjusting the speed settings thereof to select an optimum speed of the power turbines appropriate to the subsisting operating conditions.

References Cited in the file of this patent

UNITED STATES PATENTS

| Number | Name | Date |
|---|---|---|
| 1,454,505 | Christen | May 8, 1923 |
| 2,066,819 | Berry | Jan. 5, 1937 |
| 2,168,726 | Whittle | Aug. 8, 1939 |
| 2,173,913 | Morehouse | Sept. 26, 1939 |
| 2,280,203 | Toulmin | Apr. 21, 1942 |
| 2,302,042 | Martin | Nov. 17, 1942 |
| 2,431,687 | Drake | Dec. 2, 1947 |
| 2,454,738 | Hawthorne | Nov. 23, 1948 |
| 2,466,908 | Perrill | Apr. 12, 1949 |
| 2,488,783 | Stalker | Nov. 22, 1949 |
| 2,529,973 | Sedille | Nov. 14, 1950 |
| 2,539,960 | Marchant et al. | Jan. 30, 1951 |
| 2,601,194 | Whittle | June 17, 1952 |

FOREIGN PATENTS

| Number | Country | Date |
|---|---|---|
| 587,516 | Great Britain | Apr. 29, 1947 |
| 587,558 | Great Britain | May 7, 1947 |

OTHER REFERENCES

Flight, "Airscrews for Gas Turbines," August 7, 1947; pp. 132–134.